Figure 1:
Figure 2:
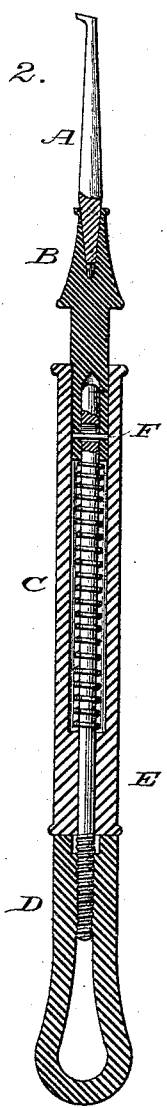

A. SHILAND.
Magnetic Dental-Pluggers.

No. 212,114. Patented Feb. 11, 1879.

Witnesses:
Nelson Hinman
Jas. P. Warford

Inventor:
Alexander Shiland

UNITED STATES PATENT OFFICE.

ALEXANDER SHILAND, OF WEST TROY, NEW YORK.

IMPROVEMENT IN MAGNETIC DENTAL PLUGGERS.

Specification forming part of Letters Patent No. 212,114, dated February 11, 1879; application filed October 1, 1878.

*To all whom it may concern:*

Be it known that I, ALEXANDER SHILAND, of West Troy, in the county of Albany and State of New York, have invented a new and useful Improvement in Dental Pluggers, which improvement is fully set forth in the following specification and accompanying drawings.

Figure I is a perspective view. Fig. II is a longitudinal section.

The object of my invention is to effect a blow with a plugger which is composed of one part, a stock, fixed to a permanent magnet, which holds by magnetic force a movable bar or tube, in such manner that a blow is given to the plugger whenever the bar or tube is forced from the poles of the magnet.

Construction: The supporting-rod or stock is fixed securely to the permanent magnet. This rod may be of brass or material not affecting the magnet. The movable part, which acts as a hammer, is composed of iron or material attracted by the magnet, and a blow is given proportional to the attractive force of the magnet and the distance allowed for the play of the movable part which strikes on the part or end of the plugger opposite to the magnet. A distance of from one-eighth to one-fourth of an inch is sufficient to give force to the blow. The tubular part C is held toward the magnet by its magnetic force and the action of a slight spring. No other device is needed, as the proper adjustment of these parts, in connection with the permanent magnet, affords the requisite blow. The movable part C, which gives the blow, may be a tubular sleeve, incasing the stock, which is secured to the magnet. The end B of the plugger, opposite the magnet, is formed with a shoulder, against which the movable part strikes when forced from its connection with the magnet. This part B is connected with the stock in such a manner as to admit a slight separate movement, in order to receive and impart the full force of the blow.

Mode of action when used: Pressing the point of the plugger against the filling of the tooth sufficient to separate the part C held by the magnet D, a blow is given to the opposite end of the plugger and to the point pressed against the filling. The blow may be repeated as often as the pressure is relaxed and renewed.

I claim—

1. In a dental plugger, the combination of stock, permanent magnet, and movable part or sleeve, for the purpose set forth.

2. The combination of a permanent magnet and dental plugger, substantially as set forth.

ALEXANDER SHILAND.

Witnesses:
 NELSON HINMAN,
 JAS. P. WARFORD.